April 2, 1957  M. L. MacKNIGHT ET AL  2,787,418
ANALOGUE-TO-DIGITAL CONVERTER SYSTEM
Filed June 14, 1952  5 Sheets-Sheet 1

FIG. 1.

INVENTORS.
MERRITT L. MacKNIGHT,
JAMES O. BEAUMONT,
BY
ATTORNEY.

April 2, 1957  M. L. MacKNIGHT ET AL  2,787,418
ANALOGUE-TO-DIGITAL CONVERTER SYSTEM
Filed June 14, 1952  5 Sheets-Sheet 4

INVENTORS.
MERRITT L. MACKNIGHT,
BY JAMES O. BEAUMONT,

ATTORNEY.

April 2, 1957     M. L. MacKNIGHT ET AL     2,787,418
ANALOGUE-TO-DIGITAL CONVERTER SYSTEM
Filed June 14, 1952                         5 Sheets-Sheet 5

FIG. 7.

INVENTORS.
MERRITT L. MacKNIGHT,
BY JAMES O. BEAUMONT,
Nicholas T Vohr
ATTORNEY.

United States Patent Office 2,787,418
Patented Apr. 2, 1957

2,787,418

ANALOGUE-TO-DIGITAL CONVERTER SYSTEM

Merritt L. MacKnight, Los Angeles, and James O. Beaumont, Cupertino, Calif., assignors, by mesne assignments, to Hughes Aircraft Company, a corporation of Delaware Application June 14, 1952, Serial No. 293,625

15 Claims. (Cl. 235—61)

This invention relates to analogue-to-digital converter systems, and more particularly to an analogue-to-digital converter system for converting a plurality of analogue signals to a corresponding plurality of digital signals.

An analogue-to-digital converter is a device which accepts instantaneous values of continuously-variable quantities and expresses these values in discrete numerical or digital form. Converters of this type have a wide variety of applications. For example, an analogue-to-digital converter is used in a computer system where analogue information applied to the input of the computer must be converted to digital information before the arithmetic operations are performed. The converter may also be used in a pulse code modulation system where it is necessary to convert analogue intelligence to a digital code, such as a binary code.

One well-known form of analogue-to-digital converter is a system for measuring a time interval by counting a number of signals or pulses occurring during the interval. The time interval is marked at its beginning by a start signal and at its end by a stop signal. The start and stop signals are utilized, respectively, to initiate and terminate the gating to a counter of clock pulses which are generated at a predetermined frequency. The counter is coded to provide the desired digital equivalent of the time interval. For example, where the time interval is to be measured as a binary-coded decimal number, a binary-coded decimal counter is utilized. An analogue-to-digital converter system of this general type is shown in U. S. Patent Serial No. 2,272,070 entitled "Electrical Signaling System," by A. H. Reeves, issued February 3, 1942.

Any analogue signal can be converted to a digital signal in the above manner if the analogue signal can be converted to an equivalent analogue time interval marked by a start and a stop signal. The conversion from an analogue signal to an analogue time interval is accomplished by combining the analogue signal and a varying reference signal in a comparator device. The reference signal is started in response to the start signal and varies according to a predetermined function of time. When the instantaneous amplitude of the reference signal is equal to the amplitude of the analogue signal, the comparator device produces an output signal which may be utilized directly, or may be applied to a stop signal generator which produces the stop signal to terminate the gating of clock pulses to a counter.

The predetermined function of time of the reference signal generator is referred to herein as its amplitude-time function. The amplitude-time function may be any arbitrary function, such as $a+bt+ct^2$, where "$a$" represents a reference starting level or reference level plus an initial step, "$b$" a slope constant which is controlled to vary the slope of the amplitude-time function, and "$c$" a compensating constant. If $c$ is positive, the function is considered as being over-compensated; if $c$ is zero, the function is linear; and if $c$ is negative, then the function is considered as being under-compensated.

While many devices are presently known for converting an analogue signal into start and stop marking signals of an equivalent time interval, these prior art devices have many limitations. Separate stop pulse generators are provided for each analogue signal to be converted in order to produce a stop signal when the amplitude of the reference signal is equal to that of the associated analogue signal. This necessitates rather complicated circuitry where a plurality of analogue signals are to be converted sequentially to digital signals. Moreover, errors are introduced into the prior art devices due to the difference in the characteristics of the stop signal generators. Other errors which are present in known conversion systems are introduced by such factors as:

1. Variations in the amplitude-time function of the reference signal generator due to:

a. Variation in the reference starting level or
   b. Variation in the slope function or
   c. Variation in the compensation 2. Variations in the amplitude of the analogue signal to be converted due to power supply variations.

3. Variations in the frequency of the clock signals which are to be gated to the counter.

The present invention discloses a novel analogue-to-digital converter which obviates the above and other disadvantages of the prior art. A reference signal generator is utilized for producing a periodic reference signal. Each period of the reference signal is started in response to a start signal, the reference signal varying in amplitude during each period in accordance with a predetermined function of time, such as described above. A plurality of sequentially-operable comparator circuits, each having a first and a second input terminal, are utilized for combining the reference signal, during each period, with a different one of a plurality of analogue signals. The reference signal is applied to the first input terminal of each comparator circuit and each of the analogue signals is applied to the second input terminal of its respective comparator circuit. A control device, responsive to the start signals, is utilized to operate the comparators in sequence so that the reference signal is combined with the desired analogue signal during each period.

The values of the constants of the amplitude-time function of the reference signal generator are determined so that the amplitude range of the analogue signals to be converted is covered, and so that the conversion for each analogue signal may be completed at a time during the associated period which allows sufficient time for the reference signal generator to prepare itself for the next conversion.

Whenever the reference signal is equal in amplitude to the analogue signal being applied to the operating comparator circuit, the comparator circuit produces an output signal which is applied to a stop signal generator. The stop signal generator produces the stop signal which terminates the gating of pulses to the counter.

Where a plurality of varying analogue signals are to be continuously converted to a corresponding plurality of digital signals, the reference signal must be cyclically produced. In this case, it is convenient to consider the reference signal as being a series of reference signals, one signal for each period, and that the reference signal generator cyclically produces this series of reference signals.

The converter system may be calibrated by varying any of the system parameters, such as the frequency of the clock signals or the amplitude-time function of the reference signal generator, during a plurality of reference signal cycles until the counter register has the correct digital count. If it is assumed that the reference signal has a linear amplitude-time function and is initiated from the desired starting level, then the system may be calibrated by varying the clock pulse frequency. Otherwise, it is preferable to calibrate the amplitude-time function of the reference signal, since then it is possible to calibrate the initial step, or starting level, and compensation as well as the slope function, and only such embodiments are described in detail.

Where it is desired to calibrate the amplitude-time function of the reference signal a controllable reference signal generator is utilized. For example, in one embodiment of the present invention, the amplitude-time function of a sawtooth generator, having a resistor-capacitor charging network and a bootstrap-integrator compensating network, is controlled by varying one of the elements in the charging network, one of the elements in the compensating network, one of the operating potentials applied to the circuit, or any combination of these variables.

When varying analogue signals are to be converted, it is desirable to calibrate the reference signal or signal frequencies continuously during operation. The present invention includes a self-calibrating embodiment for this purpose, certain periods of each operation cycle of this embodiment being utilized for calibration. During the calibrating periods, the reference signal (or one of the cyclically-produced series of reference signals) is combined with an analogue signal having a predetermined amplitude. A calibrating pulse is produced at a predetermined time during the same period. The predetermined amplitude and the predetermined time are determined by the amplitude-time function desired. In other words, the calibrating periods are utilized to determine whether or not the reference signal passes through the predetermined amplitude at the predetermined time.

The calibrating signal and the stop signal produced during the same calibrating period are combined in a device which produces an error signal proportional to the time or phase displacement between them. If, at the predetermined time, the amplitude of the reference signal is equal to the amplitude of the analogue signal having a predetermined amplitude, then no error signal is produced because the stop signal will coincide in time with the calibrating signal. However, if the amplitude of the reference signal is equal to that of the analogue signal having a predetermined amplitude at some time before or after the predetermined time, then an error signal is produced which is a function of the time or phase displacement between the stop signal produced and the calibrating signal. The error signals produced are summed to provide a correction signal which is utilized to control the reference signal generator or, where a linear reference signal is utilized, to vary the frequency of the clock pulses until no further error signals are produced.

Although a number of different types of calibration controls may be executed during each cycle of operation, only one calibration is made during each period, and the same type of calibration control, such as that executed by varying an element in the compensating network, is only made once during each cycle. Each type of calibrating control can be considered as a servo system which assumes a stable state after a number of cycles of operation when the calibrating signal and the associated stop signal coincide in time.

If the power supply potentials and the frequencies of the clock signals and the start signals remain relatively constant during each period, the calibrations made during each such period are, for the most part, independent of the absolute values thereof. This results from the fact that the amplitude of the analogue signals having predetermined values, and the absolute value of the predetermined time at which a calibrating signal is produced are predetermined fractions of the power supply potential and the frequency of the clock signals, respectively. For example, an increase in amplitude of one of the predetermined analogue signals due to an increase in power supply potential is compensated for by a correction potential applied to the reference signal generator, and any change in the frequency of the clock signals causes a corresponding change in the frequency of the calibrating signals.

Accordingly, it is an object of the present invention to provide an analogue-to-digital converter for converting a plurality of analogue signals to digital signals wherein a periodic reference signal is combined, during each period thereof, with a different one of the analogue signals to be converted.

Another object of the present invention is to provide an analogue-to-digital converter system for converting a plurality of analogue signals to digital signals wherein only one circuit is required for producing stop signals.

A further object of the present invention is to provide a system for converting a plurality of analogue signals to digital signals which is self-calibrating with respect to the amplitude-time function of the reference signal.

Another object of the present invention is to provide a self-calibrating analogue-to-digital converter, for converting a plurality of analogue signals to digital signals, which functions without substantial errors even though the amplitude-time function of the reference signal generator may vary due to variations in its reference starting level, variations in its slope function, or variations in the amount of its compensation.

Still another object of the present invention is to provide a self-calibrating analogue-to-digital converter which operates without substantial errors due to power supply potential variations or variations in the frequency of the start signals and the signals to be counted.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Figure 1:
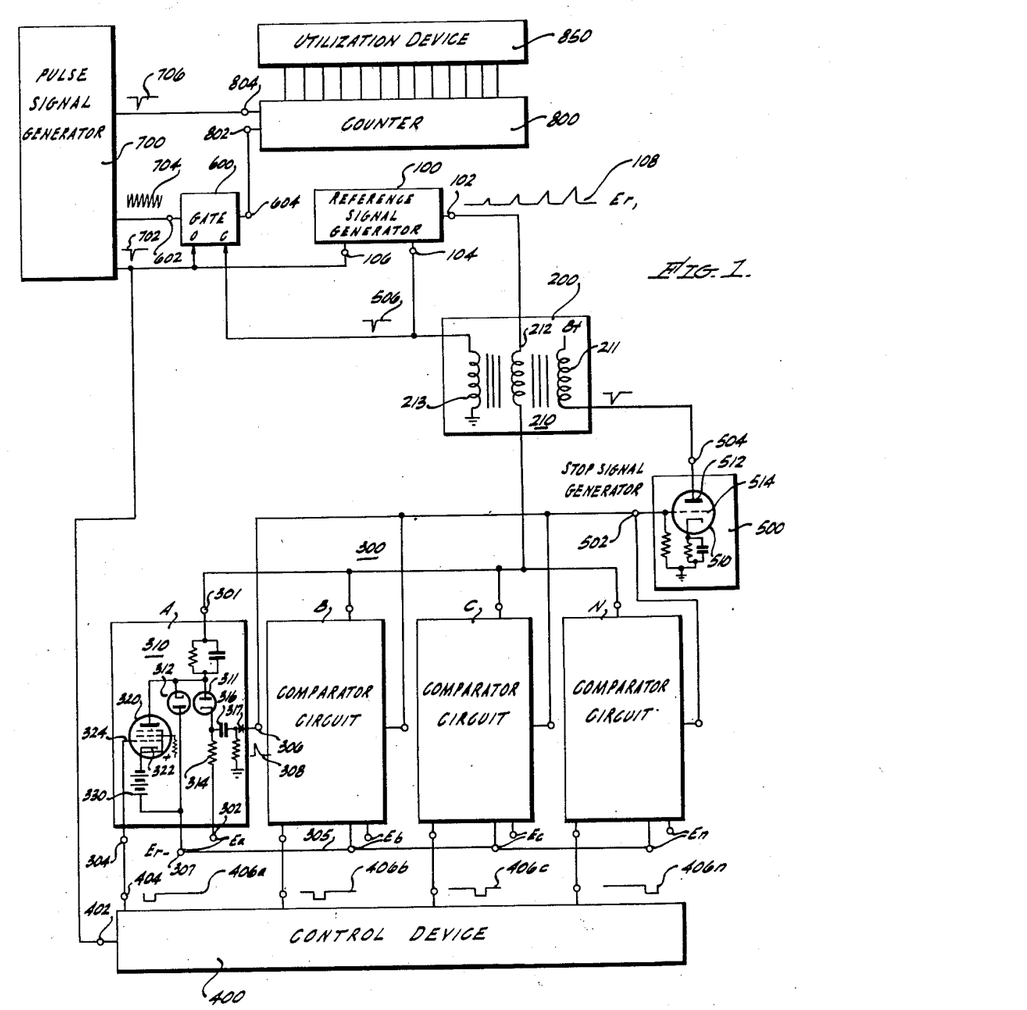
Fig. 1 is a block diagram of one embodiment of the invention.

Referring now to Fig. 1, there is shown one embodiment of an analogue-to-digital converter according to this invention in which a plurality of electrical analogue signals are converted to a corresponding plurality of electrical digital signals. The converter of Fig. 1 comprises a reference signal generator 100 for generating a periodic reference signal, a comparator network 300 for sequentially comparing the reference signal with the analogue signals to be converted, and a stop signal generator 500 for generating a stop signal when the amplitude of the reference signal coincides with the amplitude of the analogue signal being compared.

As shown in Fig. 1, reference signal generator 100 includes an output terminal 102, a stop control terminal 104, and a start-control terminal 106. Output terminal 102 of reference signal generator 100 is coupled through a coupling circuit 200 to comparator network 300 which includes a plurality of individual comparator circuits A, B, C, and N. For purposes of clarity, four comparator circuits are shown in Fig. 1, it being understood that any number of such circuits may be utilized without departing from the spirit and scope of this invention. For this reason, the fourth or last comparator circuit is designated N, rather than D. In addition, similar components in, or associated with comparator circuits A, B, C, and N, are given the same reference numeral and are distinguished by the letter $a$, $b$, $c$, or $n$ which designates the respective comparator circuit.

Each of comparator circuits A, B, C, and N has a first input terminal 301, a second input terminal 302, a control terminal 304, an output terminal 306, and a third input terminal connected to a common lead 305 to which a reference potential $Er$ is applied. First input terminal 301 of each comparator circuit is coupled through coupling circuit 200 to output terminal 102 of reference signal generator 100, while each second input terminal 302 is adapted to receive one of the analogue signals to be converted. As shown in Fig. 1, analogue signals $Ea$, $Eb$, $Ec$, and $En$ are applied between common lead 305 and second input terminals $302a$, $302b$, $302c$, and $302n$, respectively. Control terminals $304a$, $304b$, $304c$, and $304n$ are connected to output terminals $404a$, $404b$, $404c$, and $404n$, respectively of a control device 400, while each output terminal 306 is connected to input terminal 502 of stop signal generator 500 which has an output terminal 504 coupled through coupling circuit 200 to control terminal 104 of reference signal generator 100.

In order to provide digital signals, the converter of Fig. 1 includes a counter 800 having a count-pulse-input terminal 802 and a count-transfer-control terminal 804. Input terminal 802 is connected to output terminal 604 of a gate circuit 600 which has an input terminal 602, an "open-control" terminal O, and a "close-control" terminal C. Close-control terminal C of gate circuit 600 is coupled through coupling circuit 200 to output terminal 504 of stop signal generator 500. Input terminal 602 of gate circuit 600 is connected to a pulse signal generator 700 which continuously generates and applies clock pulses 704 to terminal 602.

In order to synchronize the operation of the converter, pulse signal generator 700 periodically generates a start signal 702 which is simultaneously applied to open-control terminal O of gate circuit 600, start-control terminal 106 of reference signal generator 100, and an input terminal 402 of control device 400. In addition, pulse signal generator 700 periodically generates a count transfer pulse 706 which is applied to count-transfer-control terminal 804 of counter 800. Count-transfer pulse 706 operates to transfer the count stored in counter 800 to a utilization device 850 connected to counter 800.

At the start of operation, pulse signal generator 700 produces a start signal 702 which opens gate 600 to permit the passage of clock pulses, initiates a first period I of reference signal 108, and actuates control device 400 so that it applies an operating signal $406a$ to comparator A. The time relationship between the various signals can best be observed from the wave-forms shown in Fig. 2 where the signals occurring at various points in the circuit of Fig. 1 are plotted against a common abscissa of time.

Figure 2:
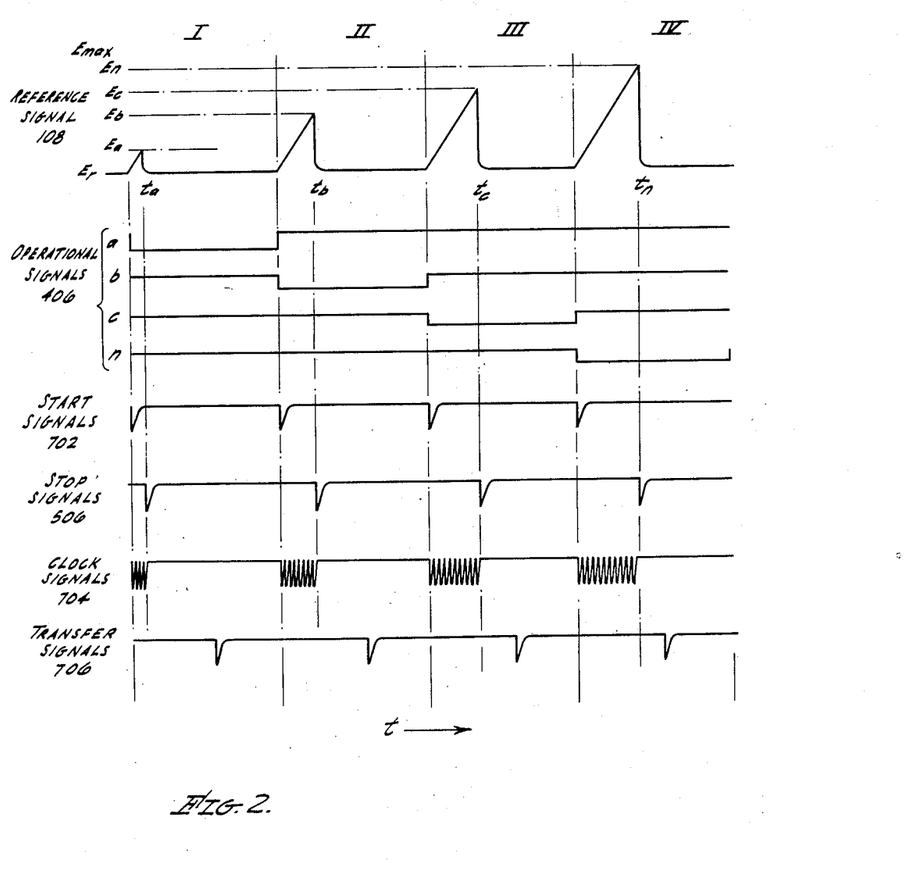
Fig. 2 is a composite diagram of the waveforms of signals appearing at various points in the embodiment of Fig. 1.

When, at time $ta$ during period I, reference signal 108 is equal to the analogue signal $Ea$ applied to the second input terminal of comparator A, an output signal 308 (Fig. 1 only) is produced, signal 308 being applied to input terminal 502 of stop signal generator 500. The stop signal generator produces a stop pulse 506 which is regenerated through comparator A in a manner more clearly described below. The stop signal is applied through coupling circuit 200 to the stop-control terminal of the reference signal generator and to the close-control terminal of gate 600. In response to the stop signal, the reference signal generator returns the reference signal to its starting reference level $Er$, and the gate closes. Assuming that the frequency of the clock pulses which are passed through the gate remains constant, the count in counter 800 is proportional to the time between start signal 702 and stop signal 506, as shown in Fig. 2.

As pointed out above, the amplitude-time function of the reference signal generator is predetermined to allow sufficient time at the end of each period for the reference signal generator to become prepared for the next period. This is primarily a function of the amount of time required for the attenuation of spurious transients. It is desirable to allow more time than is sufficient to attenuate the transients. Reference to the wave-form shown in Fig. 2 shows that only one half of each period is used for the actual conversion, and that the remainder is left unused to insure that the spurious transients are attenuated before the next period is started. It should be understood, of course, that the amount of each period which is left unused depends upon the type of reference signal generator utilized.

After each conversion has been completed and the corresponding count stored in the counter, transfer pulse 706 is produced by pulse signal generator 700 and transfers the digital information of the counter to utilization device 850.

Start pulses are applied to the control device, to the gate, and to the reference signal generator in the manner above described at the start of each of the following periods II, III, and IV, and comparators B, C, and N are operated in that order, respectively. Each time a reference signal is equal to the analogue signal applied to an operating comparator, a stop signal is produced which returns the reference signal generator to the starting reference level $Er$ and terminates the gating of the clock pulses to the counter.

One illustrative example of a circuit which is suitable for the comparators of this invention is a diode comparator circuit, as shown in comparator A in Fig. 1. Comparator A includes an isolating network 310 having one end connected to input terminal 301 and the other end connected to the anode of a first thermionic diode 311. The cathode of diode 311 is connected to a load resistor 314, and is coupled through a capacitor 316 and a crystal diode 317 to output terminal 306. The anode of first diode 311 also is connected to the cathode of a second thermionic diode 312 and to the anode of a pentode 320 which has its cathode 322 connected to the negative terminal of a source 330 of direct-current potential. The positive terminal of source 330 and the anode of second diode 312 are connected to common lead 305.

A reference potential $Er$ is applied to common lead 305 and has a magnitude equal to the reference starting level $Er$ of the reference signal. Thus, all analogue signals are measured relative to the reference starting level of the reference signal generator. The control grid 324 of pentode 320 is connected to control terminal 304 of the comparator circuit.

In operation, pentode 320 is normally conducting and maintains the anode of first diode 311 clamped slightly below the reference potential $Er$ applied to the anode of second diode 312. As a result, first diode 311 is held in a non-operating or non-conducting condition, regardless of the amplitude of the reference signal applied to input terminal 301 of the comparator.

When the first start signal is applied to control device 400, negative operating signal $406a$ is produced at output terminal 404a of the control device and is applied to control terminal 304a of comparator circuit A, thereby rendering pentode 329 non-conducting. Under these conditions, the diode comparator circuit is considered as operating. The first diode begins conducting when the amplitude of the reference signal is equal to the amplitude of the analogue signal applied to the second input terminal. An output signal 308 is produced at output terminal 306 and is coupled through coupling capacitor 316 and crystal diode 317 to input terminal 502 of the stop signal generator.

As shown in Fig. 1, by way of example, stop signal generator 500 includes an electron discharge tube 510 having anode and grid electrodes 512 and 514, respectively, connected to output and input terminals 504 and 502, respectively, of the stop signal generator; and coupling circuit 200 includes a pulse transformer 210 having first, second, and third windings 211, 212, and 213, respectively. Output terminal 504 of stop signal generator 500 is connected to one end of first winding 211 of transformer 210, the other end of first winding 211 being connected to the B+ terminal of a source of direct-current potential, not shown. Second winding 212 of transformer 210 has one end connected to output terminal 102 of reference signal generator 100, and the other end connected to first input terminal 301 of each of the diode comparator circuits. Third winding 213 of the transformer has one end connected to a stop-control terminal 104 of the reference signal generator and to close-circuit C of the gate, the other end of winding 213 being connected to ground.

In combination, tube 510, first and second transformer windings 211 and 212, and an operating diode comparator circuit comprise a "multiar" type of comparator circuit, such as is shown and described on pages 341 through 352, vol. 19 of "Waveforms" of M. I. T. Radiation Laboratory Series, published in 1949 by McGraw-Hill Book Company, Inc., New York and London. Since the operation of the "multiar" type of comparator circuit is described fully in the above reference, it is not deemed necessary to provide a detailed explanation herein. The "multiar" type of comparator circuit used herein may be considered as a blocking oscillator circuit which is "fired" when an operating first diode conducts. The blocking oscillator then regenerates the stop pulse through the first and second windings of the pulse transformer and the conducting first diode.

Figure 3:
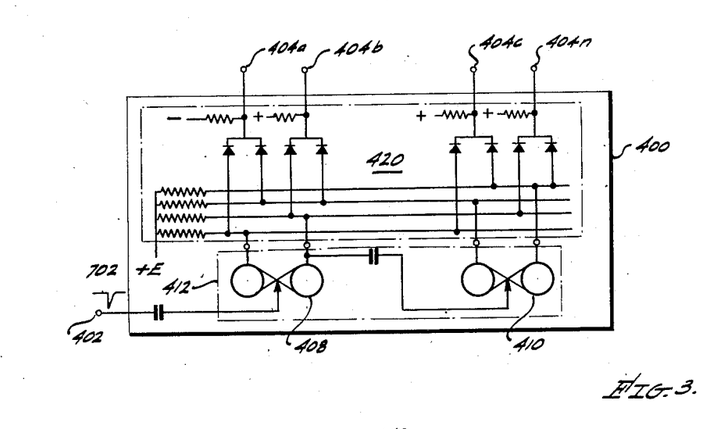
Fig. 3 is a schematic diagram of one form of the control device shown in Fig. 1.

Referring now to Fig. 3, there is shown one form of control device suitable for the embodiment of Fig. 1. A binary counter 412 is utilized to count start signals 702 which are applied to input terminal 402 of the control device, and to produce binary-coded signals at its output terminals. These binary-coded signals are translated into operating signals 406 which appear at the various output terminals of the control device by means of a diode matrix 420. The binary counter is of the type shown and described in page 15 of "High-Speed Computing Devices" by Engineering Research Associates, published in 1950 by McGraw-Hill Book Company, Inc., New York and London, and includes two flip-flops 408 and 410 connected in cascade. The theory and operation of this type of counter is fully described in the above reference, and will not be further described. A diode matrix suitable for translating the binary-coded signals into operating signals is shown and described in pages 40 to 43 of the above reference.

Figure 4:
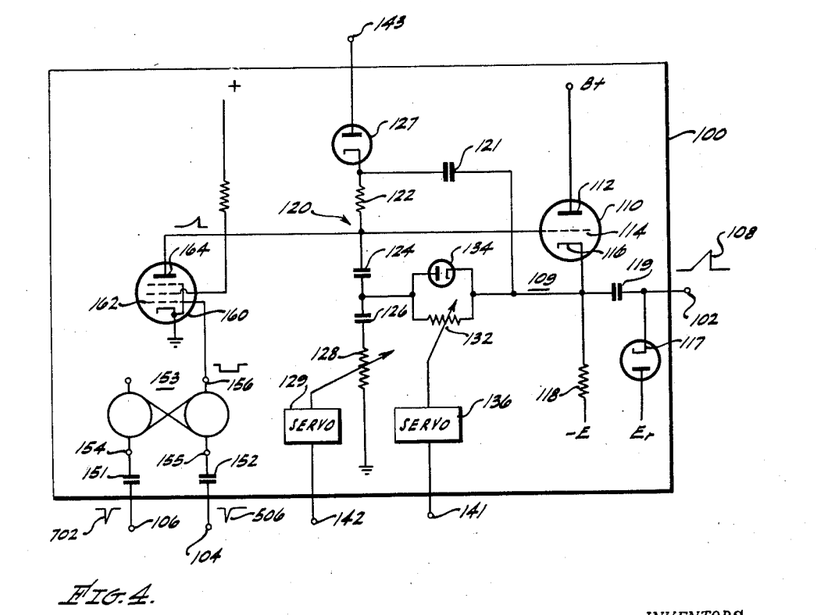
Fig. 4 is a schematic diagram of one form of the reference signal generator shown in Fig. 1.

One form of reference signal generator suitable for the circuit shown in Fig. 1 is shown in Fig. 4, and includes a cathode-follower stage 109 comprising an electron discharge tube 110 having an anode 112, a cathode 116, and a control grid 114. The anode of cathode-follower tube 110 is connected to the B+ terminal of a source of potential, not shown. The cathode of tube 110 is connected to one end of a load resistor 118 and to a compensating-control potentiometer 132 which is shunted by a first diode 134. A potential —E is applied to the other end of load resistor 118. The control grid of tube 110 is connected to the junction of a charging resistor 122 and a charging capacitor 124 included in a charging network 120. The cathode of tube 110 is coupled through a coupling capacitor 119 to output terminal 102 of the reference signal generator, the output terminal being also connected to the cathode of a clamping diode 117. The reference starting level potential Er is applied to the anode of clamping diode 117. The cathode of tube 110 is also coupled through bootstrap capacitor 121 to the junction of charging resistor 122 and the cathode of diode 127. Charging capacitor 124 is connected to an integrating capacitor 126 which, in turn, is connected to a zeroizing-control potentiometer 128. Compensating-control potentiometer 132 and zeroizing-control potentiometer 128 are controlled, respectively, by first and second servos 136 and 129 in a manner to be described.

First servo 136 is controlled by signals which are applied to first control terminal 141, and second servo 129 is controlled by signals applied to second control terminal 142. Charging resistor 122 is coupled through a bootstrap diode 127 to a third control terminal 143.

Start and stop control terminals 106 and 104 of the reference signal generator are coupled through separate capacitors 151 and 152 to input terminals 154 and 155, respectively, of a flip-flop 153 of the type shown and described on page 164 of "Waveforms" of M. I. T. Radiation Laboratory Series, published in 1949 by McGraw-Hill Book Company, Inc., New York and London. One output terminal 156 of the flip-flop is connected to control grid 162 of a switching pentode 160 which has its anode 164 connected to the junction of charging resistor 122 and charging capacitor 124.

In operation, prior to the application of a start signal, output terminal 102 of the reference signal generator is clamped at the reference starting level Er. When start pulse 702 is applied to start control terminal 106, flip-flop 153 is triggered, the potential appearing at output terminal 156 of the flip-flop falls below the cut-off potential of the switching pentode, and the switching pentode is made non-conducting or is turned "off." When the switching pentode is made non-conducting, charging capacitor 124 begins to charge and the production of the reference signal is initiated. Since the signal-producing section of the reference signal generator of Fig. 4 is a conventional cathode-follower circuit with bootstrap and integrating compensatinng networks of the type shown and described on pages 274 through 278 of vol 19 of "Waveforms" of M. I. T. Radiation Laboratory Series, published in 1949 by McGraw-Hill Book Company, Inc., New York and London, it is not deemed necessary to provide a detailed explanation of its theory and operation herein. It is important to note, however, that the amplitude-time function of the reference signal generator depends upon the signals which are applied to the control terminals of the reference signal generator.

When stop signal 506 is applied to stop control terminal 104 of the reference signal generator, flip-flop 153 is triggered and switching pentode 160 is turned "on." As a result, the signal production is terminated and the reference signal appearing at output terminal 102 of the reference signal generator is returned to the starting reference level Er.

The amplitude-time function of the reference signal generator of Fig. 4 may be manually calibrated by varying the resistance of control potentiometers 132 and 128 or the potential applied to third control terminal 143 of the reference signal generator. This is done by varying the slider positions of the control potentiometers or the potential applied to the third control terminal during several periods of the reference signal until the counter provides the digital equivalent of a known analogue signal. The effect of the various signals applied to the control terminals upon the amplitude-time function of the reference signal is described in detail below in connection with the self-calibrating embodiment shown in Fig. 5.

Figure 5:
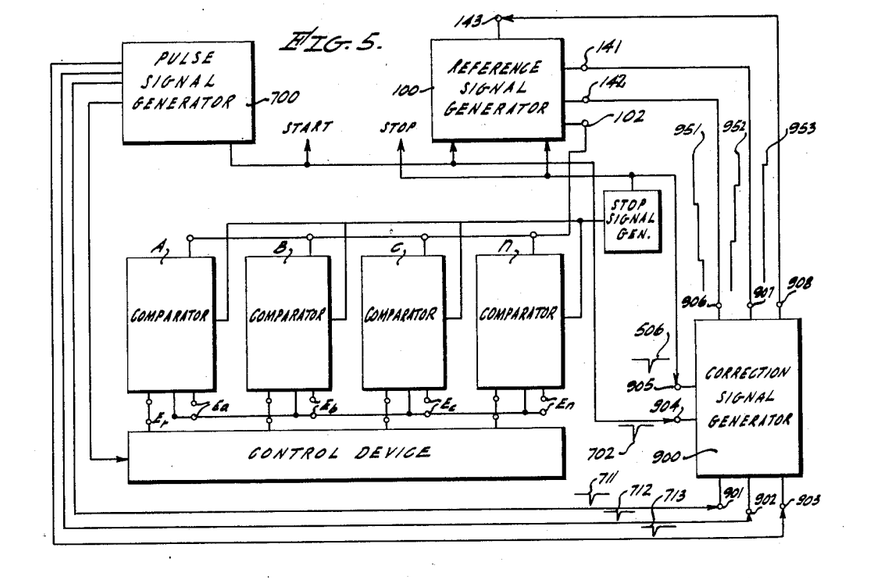
Fig. 5 is a block diagram of a modified embodiment of the present invention which includes means for calibrating the amplitude-time function of the reference signal.

Referring now to Fig. 5, there is shown one embodiment of the invention which is continuously self-calibrating during operation. The components of Fig. 5, which are the same as those shown in Fig. 1, are given the same reference designation and are described only to the extent necessary to explain the calibrating operation of the device.

Figure 7:
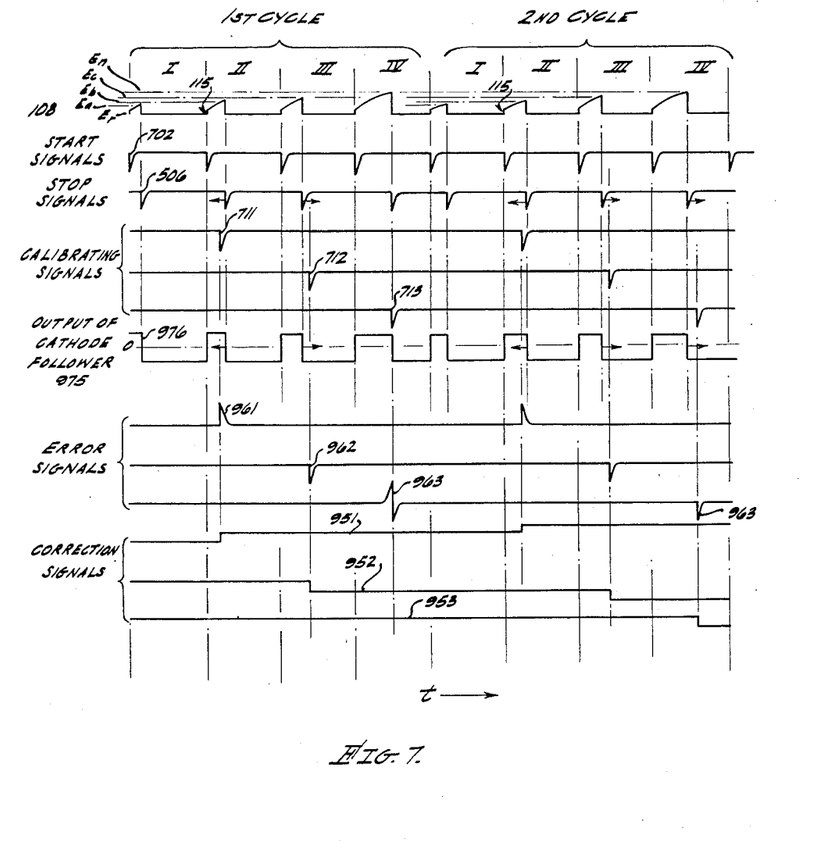
Fig. 7 is a composite diagram of the waveforms of signals appearing at various points in the embodiment of Figs. 5 and 6.

Referring now to Figs. 5 and 7, it will be noted that periods II, III, and IV of each cycle of operation are utilized for the calibrating control and are referred to as calibrating periods. The analogue signals E$b$, E$c$, and E$n$, which are combined with the reference signal during the calibrating periods, have predetermined amplitudes. At predetermined times during calibrating periods II, III, and IV, calibrating signals 711, 712, and 713 are produced by pulse signal generator 700 and applied to first, second and third input terminals 901, 902, and 903, respectively, of a correction signal generator 900. Start and stop signals 702 and 506 produced during each period are applied, respectively, to fourth and fifth input terminals 904 and 905 of correction signal generator 900. Correction signal generator 900 produces correction signals 951, 952, and 953 corresponding to the time or phase displacement between the stop and calibrating signals produced during the same calibrating period. The relative time positions of the signals can best be seen in Fig. 7 where the signals which appear at various points in the embodiment of Fig. 5 are plotted against a common abscissa of time.

In an illustrative operation, the correction signal produced during period II of each cycle of operation (only two cycles are shown in Fig. 7) is utilized to actuate servo 129 (Fig. 4) controlling zeroizing-control potentiometer 128 of reference signal generator 100, the correction signal produced during period III of each cycle of operation is utilized to actuate servo 136 controlling compensation-control potentiometer 132, and the correction signal produced during period IV of each cycle of operation is utilized to control the potential which is applied to third control terminal 143 of the reference signal generator. Although it is assumed that the reference signal generator utilized is of the type shown in Fig. 4, it should be understood that the principles which will be explained are applicable to a system which uses any type of reference signal generator.

Assuming now that stop signal 506 is produced too late in period II of the first cycle, as shown in Fig. 7, a positive error signal 961 is produced, and the amplitude of correction signal 951 is increased. Correction signal 951 is applied to the first servo 129 and causes it to vary the position of the slider of zeroizing-control potentiometer 128 so as to increase the resistance which is in series with the charging circuit. The increase of series resistance in the charging circuit increases the amplitude of initial step 115 that reference signal 108 makes at the beginning of the period. Consequently, in periods following period II of the first cycle, the initial step of the reference signal increases gradually, until the stop and calibrating signals coincide in time during a period II of a later cycle.

When the stop signal coincides in time with the calibrating signal, the error signal has an average value of zero, and correction signal 951 remains constant. The correction signal remains constant thereafter unless an error signal is produced indicating that the stop and calibrating signals are again out-of-phase. The first servo moves the slider of zeroizing-control potentiometer 128 to a fixed position in response to a correction signal of a fixed amplitude. Thus, when correction signal 951 applied to first servo 129 assumes a constant level signifying that the stop and calibrating signals coincide in time, the first servo assumes a stable position determined by the amplitude of the signal applied to it.

Assuming now that the exponential characteristics of the reference signal causes it to rise too rapidly in amplitude, then the stop signal is produced earlier than the calibrating signal during period III of the first cycle, as shown in Fig. 7. As a result, a negative error signal 962 is produced and resulting decreased amplitude correction signal 952 controls second servo 136 so that it moves the slider of compensation-control potentiometer 132 to increase the amount of second-order or integrating compensation. This, as is well known, tends to compensate for the exponential characteristic of the amplitude-time function. After a number of cycles of operation, correction signal 952 applied to the second servo will remain substantially constant and the reference signal amplitude-time function will be shaped so that the reference signal will equal the predetermined analogue signal at the corresponding predetermined time.

During period IV of the first cycle of operation, it is assumed that the stop signal coincides in time with the calibrating signal produced and an error signal having equal positive and negative increments and an average value of zero results. Consequently, no correction signal is produced for controlling the potential applied to third input terminal 143 of reference signal generator 100. However, it will be noted that in period IV of the second cycle shown in Fig. 7, the stop signal has occurred too early and, as a result, an error signal 963 is produced which decreases correction signal 953 applied to third control terminal 143 of the reference signal generator. The decrease in correction signal 953 decreases the slope function of reference signal 108. If other things remain constant, the reference signal will have an amplitude equal to the associated predetermined analogue signal during period IV of a later cycle, and the error in the slope function of the reference signal will be substantially eliminated.

Figure 6:
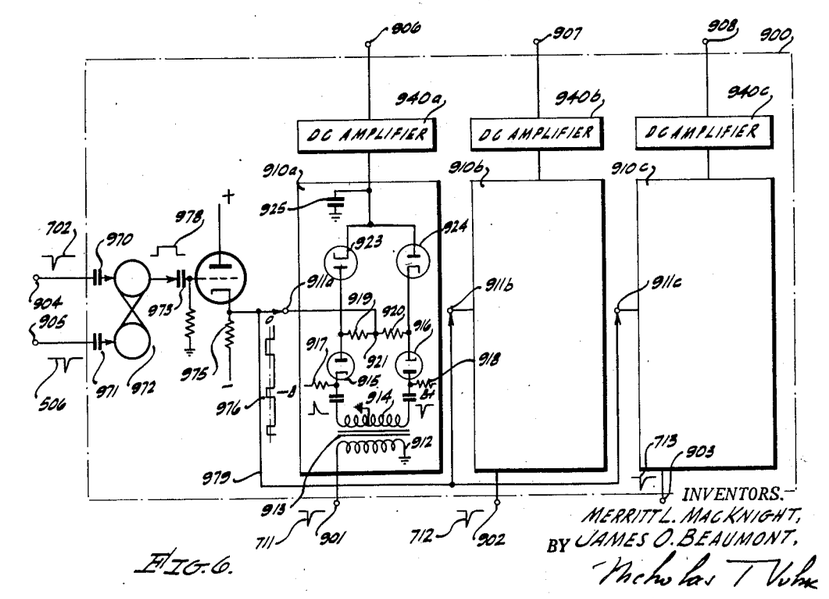
Fig. 6 is a schematic diagram of one form of the correction signal generator shown in Fig. 5.

One form of correction signal generator suitable for use in the embodiment of Fig. 5 is shown in Fig. 6, first, second, and third input terminals 901, 902, and 903 of correction signal generator 900 are connected, respectively, to first, second, and third phase discriminator circuits 910$a$, 910$b$, and 910$c$, which, in turn, are connected, respectively, to separate D.-C. amplifiers 940$a$, 940$b$, and 940$c$. The output circuits of the D.-C. amplifiers are connected to output terminals 906, 907, and 908, respectively, of correction signal generator 900. Start and stop pulses applied to third and fourth input terminals 904 and 905, respectively, of the correction signal generator, are coupled through separate capacitors 970 and 971 to the input terminals of a flip-flop 972 of the type described above. One output circuit of flip-flop 972 is coupled through a coupling capacitor 973 to a cathode-follower stage 975. An output signal 976 is derived from the cathode-follower stage and is applied in parallel via lead 979 to input terminals 911$a$, 911$b$, and 911$c$ of the phase discriminator circiuts.

Each of the phase discriminator circuits includes identical circuitry, and for simplicity, only phase discriminator 910$a$ will be described in detail. First input terminal 901 of correction signal generator 900 is connected to one end of a first winding 912 of a pulse transformer 913, winding 912 having its other end connected to ground. Pulse transformer 913 includes a second winding 914 having one end coupled through a capacitor to the cathode of a first diode 915, and the other end coupled through a capacitor to the anode of a second diode 916. The cathode of first diode 915 is connected to the —B terminal of a source of potential, not shown, by a first loading resistor 917, the anode of second diode 916 being connected to the +B terminal of the source by a second loading resistor 918.

The anode of first diode 915 is connected to the cathode of second diode 916 by a pair of series-connected resistors 919 and 920, common junction 921 of the series connection being connected to input terminal 911$a$ of phase discriminator 910$a$. The anode of first diode 915 is further connected to the anode of a third diode 923, and the cathode of the second diode 916 is further connected to the cathode of a fourth diode 924. The cathode of third diode 923 and the anode of fourth diode 924 are connected together and to one end of a storage capacitor 925, the other end of which is connected to ground.

Referring now to Figs. 6 and 7, it will be noted that at the start of each period, a start signal 702 is applied to input terminal 904 of generator 900. As a result, signal 978 at the output terminal of flip-flop 972 becomes more positive and remains positive until a stop signal 506 is applied to input terminal 905 of the generator whereupon signal 978 returns to its relatively-low original level. Signal 978 is applied through capacitor 973 to the cathode-follower stage and output signal 976 derived at the output circuit of the cathode-follower stage is applied via lead 979 to input terminals 911a, 911b, and 911c, of the phase discriminator circuits. It should be noted that signal 976 which appears on lead 979 is positive during the time interval of each period between the start signal and the stop signal, and is negative during the time interval of each period between the stop signal and the end of the period. Thus, the polarity of the signal indicates the time position during a period with respect to the stop signal.

Prior to the application of a calibrating signal, first and second diodes 915 and 916 are normally conducting and junction 921, between first and second biasing resistors 919 and 920, is clamped at ground. Furthermore, while diodes 915 and 916 are conducting, the anode of diode 915 is at the same voltage as the cathode of diode 915 and is, therefore, at some negative voltage level between ground and B—, the particular voltage level of the anode primarily depending on the relative values of resistance of resistors 917 and 919. Similarly, the cathode of diode 916 is at the same voltage as the anode of diode 916 and is, therefore, at some positive voltage level between ground and B+, the particular voltage level of the cathode primarily depending on the relative values of resistance of resistors 918 and 920. The negative voltage at the anode of diode 915 and the positive voltage at the cathode of diode 916 are also applied to the anode of diode 923 and the cathode of diode 924, respectively. Accordingly, third and fourth diodes 923 and 924 are biased negatively and positively, respectively, that is, they are back-biased, so that neither conducts. As a result, the signal on lead 979 does not have any effect on the conduction state of the diodes. When a calibrating signal, such as 711, 712, or 713, is applied to one of the input terminals of the correction signal generator, the associated first and second diodes are biased so that they are non-conducting by signals produced in the secondary winding of the pulse transformer. More specifically, the application of signal 711 to primary winding 912 causes positive and negative signals to be applied to the cathode and anode of diodes 915 and 916, respectively, these latter signals being of sufficient voltage magnitude to back-bias the diodes and, thereby, render them non-conducting. When this happens, diodes 923 and 924 are isolated from the B— and B+ sources of voltage so that the back-biasing voltages applied to the anode and cathode of diodes 923 and 924, respectively, are removed and these diodes become capable of conducting current. Furthermore, the junction point between biasing resistors 919 and 920 is then no longer clamped at ground and rises or falls in accordance with the amplitude variation of output signal 976 applied to the input terminal of the phase discriminator. Thus, if the calibrating signal 711 occurs prior to the stop signal 506, signal 976 is at a positive voltage level as previously mentioned and a positive voltage is applied to the anode and cathode of diodes 923 and 924, respectively. Consequently, diode 924 is back-biased and, therefore, rendered non-conducting and diode 923 is forward-biased and, therefore, rendered conducting, a positive error signal, such as 961, thereby passing through the third diode to storage capacitor 925 and stored therein. The signal appearing across the capacitor has a waveshape similar to correction signal 951 shown in Fig. 7. If, however, the calibrating signal is produced after a stop signal, then signal 976 is at a negative voltage level and a negative voltage is applied to the anode and cathode of diodes 923 and 924, respectively, which voltage renders diode 924 conducting. As a result, a negative error signal 962 is produced and passed through the fourth diode and is effective to partially discharge the storage capacitor. When the phase calibrating signal and stop signal coincide in time, both positive and negative error signals are produced and the effective error signal is zero. This occurs in period IV of the first cycle. (See signal 963.)

From the above, it can be seen that the polarity of the error signal which is applied to the storage capacitor is a direct function of the phase relationship of the calibrating signal and the stop signal, and that the signal stored in the storage capacitor assumes a substantially constant value when the stop signal coincides with an associated calibrating signal.

While the comparator circuit and the stop signal producing circuit are shown separately in Figs. 1 and 5, they may be combined into a single circuit. Examples of such combined circuits are shown on pages 339 through 343 of vol. 19 of "Waveforms" of M. I. T. Radiation Laboratory Series, published in 1949 by McGraw-Hill Book Company, Inc., New York and London. Where it is desired to minimize the number of tubes required, the "multiar" type of comparator is preferred.

It should be noted that many types of reference signal generators, control devices, and correction signal generators may be utilized in embodiments of the present invention. For example, illustrative forms of reference signal generators which are suitable may be found on pages 158 to 159 of "Time Bases," Second Edition, by Puckle, published in 1951 by McGraw-Hill Book Company, Inc., New York and London; the control device may utilize any of the well-known types of counters provided that a suitable translating matrix is provided where necessary; and illustrative types of correction signal generators which may be utilized are shown on pages 364 through 388 of vol. 19 of "Waveforms" of M. I. T. Radiation Laboratory Series, published in 1949 by McGraw-Hill Book Company, Inc., New York and London.

It should be noted that the invention may be utilized to convert any number of analogue signals to digital signals, and is not limited to the specific cases described herein. Moreover, it is not necessary to provide three calibrating controls during each cycle of operation as was described with regard to Fig. 5. In many applications, only one or two calibrating controls may be required, whereas in others, it may be desirable to provide even more than three calibrating controls.

What is claimed as new is:

1. In an analogue-digital converter for converting a plurality of sequentially occurring analogue signals to digital signals, respectively, by converting said plurality of analogue signals to a corresponding plurality of sequential analogue time intervals, each one of said time intervals being defined by a start and stop signal utilized for initiating and terminating, respectively, the operation of a counter, the combination comprising: means responsive to the start signals for producing a plurality of reference signals in sequence corresponding to the plurality of sequential analogue signals, respectively, each one of said reference signals starting at a predetermined reference voltage level and increasing linearly in amplitude at a predetermined rate; and a plurality of sequentially-operable comparators electrically coupled to said means, one comparator for each of the analogue signals, for sequentially combining said plurality of analogue and reference signals, respectively, to produce a corresponding plurality of stop signals, each one of said plurality of comparators including input means for receiving different corresponding ones of the analogue and reference signals.

2. In a system for converting a plurality of sequentially occurring analogue signals to digital signals, respectively, by converting said plurality of analogue signals to a corresponding plurality of sequential analogue time intervals, each one of said time intervals being defined by a start and stop signal utilized for initiating and terminating, respectively, the operation of a counter, the combination comprising: first means responsive to the start signals for producing a plurality of reference signals in sequence corresponding to the plurality of sequential analogue signals, respectively, each one of said reference signals starting at a predetermined reference voltage level and increasing linearly in amplitude at a predetermined rate; second means responsive to the start signals for producing a plurality of operational signals in sequence corresponding to the plurality of sequentially occurring analogue signals; and a plurality of sequentially-operable comparators electrically coupled to said first and second means, one comparator for each of the analogue signals, and rendered operable in sequence by said operational signals, respectively, to sequentially combine different corresponding ones of the plurality of analogue and reference signals to produce a corresponding plurality of stop signals.

3. An analogue-to-digital converter for converting a plurality of applied analogue signals to corresponding digital signals, respectively, said converter comprising: a counter, gating means for applying counting pulses to said counter at a predetermined frequency, first means for producing a periodic reference signal, said reference signal starting at the beginning of each period at a predetermined reference level and increasing linearly in amplitude at a predetermined rate; a plurality of comparator circuits, one for each of said analogue signals, said comparator circuits being sequentially operable to combine said reference signal during each of its periods with a different one of said plurality of analogue signals to produce a stop signal when the amplitude of said reference signal is equal to the amplitude of the associated analogue signal; second means for producing start signals, one start signal being produced at the beginning of each of said periods, said first means being responsive to said start signals to initiate the corresponding period of said reference signal, and said gating means being actuated by said start signals to apply counting pulses to said counter; and control means responsive to said start signals for sequentially actuating said comparator circuits, whereby said analogue signals are effectively converted to corresponding time intervals marked by said start and said stop signals, said gating means being responsive to said stop signals to terminate the application of counting pulses to said counter.

4. In a system for converting a plurality of analogue signals to digital signals, respectively, by converting said analogue signals to analogue time intervals marked by stop signals and utilizing said start and stop signals to initiate and terminate, respectively, the operation of a counter, the combination comprising: means for producing a series of signals, each signal of said series being started, in response to a start signal, from a predetermined amplitude and increasing linearly in amplitude at a predetermined rate; sequentially-operable means for combining each of said linearly-increasing signals with a different one of said plurality of analogue signals to produce a stop signal when the amplitude of said linearly-increasing signal is equal to the amplitude of said one analogue signal, said sequentially-operable means including a blocking oscillator for producing said stop signals, and a plurality of diode comparator circuits for actuating said blocking oscillator, each of said diode comparator circuits comprising a first diode having an anode and a cathode, a load resistor connected to the cathode of said cathode, an isolating network connected to the anode of said first diode, a second diode having an anode and a cathode, the cathode of said second diode being connected to the anode of said first diode, means for applying a potential to the anode of said second diode said potential having a magnitude equal to said predetermined amplitude, and an electron discharge tube having at least an anode, a cathode, and a control grid, the anode of said tube being connected to the cathode of said second diode; and control means responsive to the start signals for operating said sequentially-operable means.

5. The combination defined in claim 4 wherein said control means includes a binary counter comprising a plurality of cascaded flip-flops each having input and output circuits and a diode matrix connected to the output circuits of said flip-flops for translating binary-coded signals appearing at the output circuits of said flip-flops into operating signals which are applied to the control grid of said tube.

6. In an analogue-to-digital converter wherein a plurality of analogue signals, including at least one signal having a predetermined amplitude, are converted to a corresponding plurality of analogue time intervals, each of the time intervals being initiated and terminated by a start signal and a stop signal, respectively, a self-calibrating, stop-signal-generating system comprising: signal-responsive means for cyclically producing a series of reference signals corresponding to the plurality of analogue signals, each of said reference signals being initiated in response to a start signal and varying in amplitude in accordance with a predetermined function of time, said signal-responsive means being controllable to vary said predetermined function of time; comparator means for combining said analogue signals with said reference signals, respectively, during each cycle of said signal-responsive means, said comparator means producing a stop signal at the instant in each cycle of said signal-responsive means when the amplitude of said one signal having a predetermined amplitude is equal to the amplitude of the associated reference signal; means for generating a calibrating signal at a predetermined time after each initiation of said associated reference signal; and means responsive to said calibrating signal and said stop signals for producing a correction signal corresponding to the relative time displacement between said calibrating and stop signals, said last-named means controlling said signal-responsive means by varying the predetermined function of time of said reference signals in accordance with said correction signal until one of the stop signals coincides again in time with the associated calibrating signal.

7. In an electrical conversion system wherein a number of first analogue signals and a number of second analogue signals having predetermined amplitudes are converted to a corresponding plurality of analogue time intervals, each of the time intervals being initiated and terminated by a start signal and a stop signal, respectively, the combination comprising: signal-responsive means for producing a periodic reference signal, said reference signal being initiated at the beginning of each period in response to a start signal and varying in amplitude during each period in accordance with a predetermined function of time, said signal-responsive means including at least one variable element for varying said predetermined function of time; comparator means for combining said reference signal during first periods with said first analogue signals, respectively, and during second periods, with said second analogue signals, respectively, said comparator means producing a stop signal during each period when said reference signal is equal to the amplitude of the associated one of said analogue signals; means for generating a calibrating signal at a predetermined time after the beginning of each of said second periods; and means responsive to said calibrating signal and said stop signals for producing a correction signal corresponding to the relative time displacement between said calibrating and stop signals, said last-named means controlling said signal-responsive means by varying the predetermined function of time of said reference signals in accordance with said correction signals until one of the stop signals coincides again in time with the associated calibrating signal.

8. The combination defined in claim 7 wherein said signal-responsive means includes a charging network and a potentiometer connected in series with said network, said potentiometer being said one variable element and being variable to change the initial step of said predetermined function of time.

9. The combination defined in claim 7 wherein said signal-responsive means includes a compensating network having a variable resistor, said variable resistor being said one variable element for varying the compensation of said predetermined function of time.

10. The combination defined in claim 7 wherein said signal-responsive means includes a charging network and means for varying the potential applied to said charging network, said potential-varying means being said one variable element for varying said predetermined function of time.

11. In an analogue-to-digital converter wherein a number of a first analogue signals, and a number of second analogue signals having predetermined amplitudes are converted to a corresponding plurality of analogue time intervals, each of the time intervals being initiated and terminated by a start signal and a stop signal, respectively, a self-calibrating, stop-signal-generating system comprising: signal-responsive means for cyclically producing a series of first reference signals and a series of second reference signals corresponding to said first and second analogue signals, respectively, each of said reference signals being initiated in response to a start signal and varying in amplitude in accordance with a predetermined function of time, said signal-responsive means being controllable to vary said predetermined function of time; comparator means for combining said first and second analogue signals with said first and second series of reference signals, respectively, during each cycle of said signal-responsive means, said comparator means producing first stop signals when the amplitudes of said first analogue signals are equal to the amplitudes of the associated ones of said first reference signals and producing second stop signals when the amplitudes of said second analogue signals are equal to the amplitudes of the associated ones of said second reference signals; means for generating a calibrating signal at a predetermined time after the initiation of each of said second reference signals; and correction signal generator means responsive to said calibrating signal and said second stop signals for producing a correction signal corresponding to the relative time displacement between said calibrating and stop signals, said means controlling said signal-responsive means by varying the predetermined function of time of said reference signals in accordance with said correction signal until one of the stop signals coincides again in time with the associated calibrating signal.

12. The self-calibrating stop signal generating system defined in claim 11 wherein said correction signal generator means includes a plurality of phase discriminators, said phase discriminators being responsive to the phase displacement between said calibrating signal and the associated one of said second stop signals to produce a correction signal, said correction signal being applied to said signal-responsive means for varying said predetermined function of time until said phase displacement is zero.

13. In an analogue-to-digital converter wherein a plurality of analogue signals, including at least one signal having a predetermined amplitude, are converted to a corresponding plurality of analogue time intervals, each of the time intervals being initiated and terminated by a start signal and a stop signal, respectively, a self-calibrating, stop signal generating system comprising: first means for cyclically producing a series of reference signals corresponding to the plurality of analogue signals, respectively, each of said reference signals being initiated in response to a start signal and varying in amplitude in accordance with a predetermined function of time; second means for combining said analogue signals with said reference signals, respectively, during each cycle of said first means, said second means producing a stop signal at the instant of each cycle of said first means when the amplitude of said one signal having a predetermined amplitude is equal to the amplitude of the associated reference signal; third means for generating calibrating signals at a predetermined time after each initiation of said associated reference signal; at least one of said first, second, and third means including a variable element responsive to a correction signal; fourth means responsive to said calibrating signal and said stop signal for generating a correction signal corresponding to the relative time displacement between said calibrating and stop signals; and fifth means for applying said correction signal to said variable element to vary said variable element until said stop signal coincides again in time with said calibrating signal.

14. An analogue-to-digital converter wherein a plurality of analogue signals are converted to a corresponding plurality of time intervals, each of the time intervals being initiated and terminated by start and stop signals, respectively, said converter comprising: first means for cyclically producing a series of reference signals corresponding to the plurality of analogue signals, respectively, each of said reference signals being initiated in response to a start signal and varying in amplitude in accordance with a predetermined function of time; a plurality of comparator circuits for combining said analogue signals with said reference signals, respectively, during each cycle of said first means, each of said comparator circuits producing an output signal when the corresponding analogue and reference signals are substantially equal in amplitude; stop-signal generating means responsive to said comparator circuit output signals for producing a stop-signal at the instant of each cycle of said first means when the corresponding analogue and reference signals are equal in amplitude; and control means responsive to the start signals for synchronizing the sequence of operation of said comparator circuits.

15. The system defined in claim 6 wherein said signal-responsive means includes a sawtooth generator having a resistor-capacitor charging network responsive to the start signals for producing said series of reference signals, each signal of said series being started from a predetermined amplitude and increasing linearly in amplitude at a predetermined rate, and a bootstrap integrating network electrically coupled to said charging network and to said means responsive to said calibrating signal and operable in response to said correction signal to compensate for any non-linearity in each signal of said series of reference signals.

References Cited in the file of this patent

UNITED STATES PATENTS

| 2,486,390 | Cunningham | Nov. 1, 1949 |
| 2,505,029 | Carbrey | Apr. 25, 1950 |
| 2,521,733 | Lesti | Sept. 12, 1950 |
| 2,530,538 | Rock | Nov. 21, 1950 |
| 2,556,200 | Lesti | June 12, 1951 |
| 2,568,724 | Earp | Sept. 25, 1951 |
| 2,616,965 | Hoeppner | Nov. 4, 1952 |

OTHER REFERENCES

Proc. of the IRE, vol. 39, No. 1, January 1951, "A Multichannel PAM–FM Radio Telemetering System" (pages 36 to 43).

Electrical Engineering, November 1949, "The Binary Quantizer" by K. H. Barney (pages 962 to 967).

Electrical Engineering, May 1950, "The Metrotype System of Digital Recording and Telemetering" by G. E. Foster (pages 427–430).